United States Patent [19]

Nestler

[11] Patent Number: 4,645,036

[45] Date of Patent: Feb. 24, 1987

[54] PRODUCT DISPENSER

[76] Inventor: Richard F. Nestler, 1385 Glencoe Ave., Pittsburgh, Pa. 15205

[21] Appl. No.: 560,446

[22] Filed: Dec. 12, 1983

[51] Int. Cl.⁴ .......................... B65G 1/00; B65G 47/00
[52] U.S. Cl. ...................................... 186/55; 186/57; 221/197; 221/281; 221/283
[58] Field of Search ............................. 186/55, 56, 57; 222/505; 221/75, 197, 281, 283, 61

[56] References Cited

U.S. PATENT DOCUMENTS

| | | | |
|---|---|---|---|
| 591,215 | 10/1897 | Ganon | 221/197 |
| 921,941 | 5/1909 | Ballard | 222/505 |
| 1,005,382 | 10/1911 | Webster | 221/197 |
| 2,661,991 | 12/1953 | Petrecca | 221/281 |
| 2,689,062 | 9/1954 | Brown | 221/197 |
| 3,058,545 | 10/1962 | Morehouse | 186/55 |
| 3,313,449 | 4/1967 | Parks | 186/55 |
| 3,541,309 | 11/1970 | Cutter | 186/55 |
| 3,542,245 | 11/1970 | Braginetz | 221/283 |
| 3,648,241 | 3/1972 | Naito et al. | 186/56 |
| 3,908,800 | 9/1975 | Drapeau | 186/56 |
| 3,920,100 | 11/1975 | Dunphy | 186/56 |
| 4,061,245 | 12/1977 | Lotspeich | 221/75 |

Primary Examiner—Albert J. Makay
Assistant Examiner—Steven E. Warner
Attorney, Agent, or Firm—Andrew J. Cornelius

[57] ABSTRACT

A product dispenser is provided which discourages theft of the products contained by the dispenser by the consuming public yet quickly and easily delivers the product to a salesclerk to make a sale to a consumer. The compartment unit of the dispenser which stores the products cooperates with the shell of the dispenser to prevent direct access to the product. The compartment unit can be extended from the shell to make the compartments of the compartment unit accessible to a store clerk to stack products in or remove products from the compartments. Apparatus is provided to permit a store clerk to make an entry on a console which causes apparatus within the dispenser to eject the desired product and deliver it to the store clerk. Electronic controls can be provided to store information relating to the dispensing of products by the dispenser to aid in the control of inventory by the store owner.

13 Claims, 9 Drawing Figures

PRODUCT DISPENSER

BACKGROUND OF THE INVENTION

1. Field of the Invention

The present invention pertains to article dispensing and, more particularly, to a dispenser which can be used by a retailer to dispense retail products.

2. Description of the Prior Art

An analysis of the retail industry demonstrates the inventorying and merchandising of many high volume, low profit, high pilferage items. A deeper analysis of the retail industry indicates that net profits in supermarkets average about one cent per dollar as a national average. In smaller convenience stores, national averages of net profits are approximately three and one-half cents per dollar. In this very highly competitive field, innovations are made infrequently, even though frequent innovation is badly needed. Accordingly, one of the main concerns of the retailer is the need to reduce or eliminate problems which reduce the profit realized by the retailer. Such problems include product theft, effective utilization of floor space, unnecessarily high levels of inventory, and the maintenance of a profitable level of labor and other types of overhead. At the same time, the retailer must provide competitive pricing in this highly competitive business, properly service the retailer's customers, and realize a profit level sufficiently high to maintain the retailer in business.

Generally, products which are offered for sale to the consuming public are physically located in areas where consumers shop. The products are made visible to the consumers to create a desire in the consumer to purchase the product. Supplies of the products are maintained in the stores which are adequate to satisfy the perceived demand for the product by consumers to encourage sales by permitting consumers to leave the store with the product they purchased, rather than requiring the consumer to purchase the product for later delivery to the consumer. However, such accessibility to the consumer of relatively large supplies of products encourages some consumers to steal products, especially small easily concealable products, rather than to purchase them. Obviously, each theft of a product reduces the income of the store owner. The store owner's loss from theft is aggravated where the types of products stolen are those which are sold in high volume by the store owner and which generate a small profit for each sale. For example, for each package of cigarettes stolen from a store owner, it is necessary for the store owner to sell approximately 80 additional packages of cigarettes to recover the store owner's cost of the stolen pack. Product theft is paid for from net profits, normally one percent on the dollar in supermarkets. Further, because of the high demand for cigarettes and the ease with which a pack of cigarettes can be concealed by the consumer, the theft of cigarettes in great quantities is widespread. Because the profit realized by a store owner from the sale of a single pack of cigarettes is low, the theft of cigarettes presents a major problem to store owners.

A second major problem facing retail store owners is maintenance of an inventory of products that is sufficiently high to meet the demand of the consuming public, but that is not so high that an excessively great amount of money is represented by the inventory on a continual basis. Although many types of inventory control systems and apparatus have been devised, they are usually complicated and expensive and are used to regulate the inventory of only large retailers. Smaller retailers generally cannot justify the cost of such a system to control the inventory of all their products. However, small retailers may have problems maintaining an adequate inventory of selected types of products and, accordingly, could profit from an inventory control system that can be applied on a product-by-product basis.

Further, the manner in which most large retail stores, such as supermarkets, receive new products and convey them to areas of the store for purchase by consumers creates a problem for the store owner. In particular, products are received by the supermarket and stored in a stockroom until needed on the shelves. Theoretically, as the products are needed on the shelves, stock personnel transfer the products from the storerooms to the shelves. However, any delay in making the transfer results in an out of stock condition in the store and lost sales. The problem is aggravated when the product involved represents a high volume of sales over a short period of time, requiring frequent transfer of the product from the storeroom to the shelves. Regarding the sale of cigarettes by supermarkets, the problem is further aggravated by the fact that checkout clerks are generally responsible for making the transfer of cigarettes from the stockrooms to the shelves, which are generally located at the checkout counters in an attempt to reduce theft of cigarettes by consumers. Often, the checkout clerk is asked for a brand of cigarettes that is not available at the checkout counter but which is available in sufficient supply in the stockroom. Because the checkout clerk is usually under a great deal of time pressure, the clerk is not willing to travel to the stockroom to satisfy the consumer's demand for the product. Instead, the consumer is usually told that the store has no cigarettes of the brand demanded. Accordingly, sales of cigarettes are often lost by supermarkets.

Accordingly, there is a need for a storing device or dispenser which discourages the theft of easily concealable consumer products. Further, there is a need for such a dispenser that provides information relative to the number of sales of the products stored in the dispenser. Further, there is a need for a dispenser that ensures that products are always available for purchase by consumers.

SUMMARY OF THE INVENTION

The present invention provides a product dispenser that includes a shell and at least one storage compartment. The compartment is capable of receiving and storing a plurality of products. The compartment is capable of assuming a retracted position in which the compartment cooperates with the shell to prevent direct access to the products, and an extended position in which direct access to the products is possible to permit loading and unloading of the compartment. Apparatus is provided for vertically changing the position of the compartment when the dispenser is mounted to a ceiling to move the compartment between its extended and retracted positions. Although the movement of the compartment can include both horizontal and vertical components, movement preferably is purely vertical. Apparatus is provided for selectively ejecting at least one product from the compartment and apparatus for receiving an ejected product and delivering it to a desired location.

When the compartment is in its retracted position, direct access to the products is not possible. Unless the compartment is being loaded or unloaded, the compartment should be maintained in its retracted position, thereby discouraging theft of the products. When it is desired to load the compartment with products, the compartment should be moved to its extended position.

Preferably, the dispenser includes a plurality of storage compartments to facilitate storage of different types of products or different brands of the same type of product, such as cigarettes. Also, the compartments can be so configured and arranged that the products are stacked vertically in each compartment and the ejecting apparatus ejects one or more products from the bottom of a stack.

Preferably, the receiving apparatus includes a conveyor belt onto which a product can be ejected and conveyed to a dispensing port defined by the shell. The receiving apparatus can also include a chute which receives an ejected product from the conveyor and guides it to the desired location. Where more than one location is to be serviced by the dispenser, additional chutes are added to the dispenser as necessary to service the desired number of locations. The dispenser can be lengthened or shortened as desired.

When it is desired to place the products in an area that is not easily accessible to the consuming public, the shell of the dispenser can be suspended from the ceiling of the store. The compartments are received by the shell when they are in their retracted positions and are lowered to a level where store personnel can stock the compartments when the compartments are in their extended positions. Such an arrangement is particularly useful for the storage and dispensing of packs and/or cartons of cigarettes. This method of merchandising provides a means of making the product readily available to the consuming public, but not readily accessible without proper payment made to the retailer. Additionally, this method of merchandising discourages retail employees as well as customers from pilfering the merchandise in the dispenser. Further, this dispenser provides the option of permitting the retailer to utilize presently wasted air space instead of very valuable floor space, usually located at high traffic, prime merchandising areas (for example, around the checkout) for other high profit merchandise. In essence, this dispenser has the favorable effect of enabling a retailer to increase the size of a given location without costly addition. The shell can define at least one surface which is adapted to receive and support such printed material as product advertisements. The surfaces can be leased to product manufacturers for the advertising of their products. If the dispenser is sold to a store owner the lease income can be realized by the store owner. If the dispenser is leased to the store owner by the owner of the dispenser, the lease income can be realized by the dispenser owner. This method of advertising, regardless of distribution of revenues derived therefrom, provides the favorable effects of assisting the retailer in the sale of merchandise inventoried, and at the same time offsets the costs of the dispenser. According to surveys taken, 64.9% of all retail purchases are decided upon after the customer enters the store. This dispenser advertising method, in essence, represents a new media for retailers and manufacturers of products sold in retail outlets heretofore nonexistent. Ninety-five percent of all present advertisements are seen or read when the prospective consumer is in no position to purchase the product or service advertised, for example, television, newspaper, radio, billboard and magazine advertising. Point of sale advertising is known to be the most effective.

The dispenser can be used with a system that recognizes and records the ejecting of a product from the dispenser to provide information to the store owner that is helpful for maintaining an inventory of a product of a proper size.

Accordingly, the present invention provides a dispenser that denies access to the products by the consumers and which can be placed in an area that is not readily accessible by consumers, and, therefore, which severely curtails theft of the product. Further, the dispenser permits a retail store owner to transfer the inventory of the product from a storeroom to an area which is easily accessible by a store clerk or, in the case of products which are not commonly stolen by consumers, to an area where consumers may select the product for purchase. The dispenser therefore permits the store owner to receive new products from the manufacturer and transfer them immediately to the dispenser, rather than to a stockroom and then later to shelves in the store or to the point of sale, thus virtually eliminating out-of-stock conditions in a retail store. Finally, the dispenser can be used in a system that provides information to the store owner pertaining to the amount of products in the dispenser and, accordingly, in the store owner's inventory, to ensure that an adequate inventory of the product is always available. In summary, the dispenser ensures that consumer demand for the product is always satisfied and that it is satisfied by the sale of products rather than by their theft.

The advantages provided to retailers, consumers, and manufacturers by the preferred embodiment of the present invention are summarized below:

Dispenser advantages to retailers:
 1. Reduces out-of-stock condition and resulting loss of sales
 2. Reduces theft (customers and employees)
 3. Uses air space instead of floor space
 4. Eliminates backroom inventory and inventory space in backroom
 5. Reduces labor overhead by means of weekly stocking instead of daily stocking
 6. Rotates product (top loading, bottom discharge)
 7. Automatic accurate recording (if used with a monitoring system)
 8. Instantaneous inventory readout-printout (if used with a monitoring system)
 9. Expands product lines, i.e. 192 different brands of cigarettes can be dispensed—stores presently carry 60 to 70 brands
 10. Eliminates satisfying bad habits by stealing (i.e. stolen cigarettes)
 11. Services more customers
 12. Increases the size of sales floor
 13. Results in better service, sales and profits
 14. Eliminates costly security measures Advantages to consumer:
 1. Saves consumers money. Each American consumer (man, woman and child) pays $200.00 every year for product theft
 2. Ensures availability of desired product
 3. Provides consumer with fresh product by automatic rotation
 4. Reduces stops per shopping trip
 5. Provides potential to reduce prices Advantages to manufacturer:

1. Provides point-of-sale advertising
2. Expands number of products at retail outlet
3. Reduces out-of-date returns
4. Provides means for sampling and monitoring new products, or sampling to promote old products
5. Reduces sales losses due to out-of-stock conditions
6. Permits coupons to be included in samples
7. Provides heretofore nonexistent space available for product

BRIEF DESCRIPTION OF THE DRAWINGS

The following detailed description of the preferred embodiments can be understood better if reference is made to the drawings, in which.

DETAILED DESCRIPTION OF THE PREFERRED EMBODIMENTS

FIGS. 1 through 7 show the preferred embodiment of the present invention. Although the preferred embodiment can be mounted anywhere, it is shown mounted to the ceiling of a supermarket in the general area of the checkout counter. As shown, the dispenser would be particularly useful for discouraging theft of the products stored within the dispenser, while providing easy access to the products by the checkout clerk, for making available to the supermarket owner valuable floor space, and for effectively transferring the supermarket's inventory from a stockroom to the checkout counter.

Figure 1:
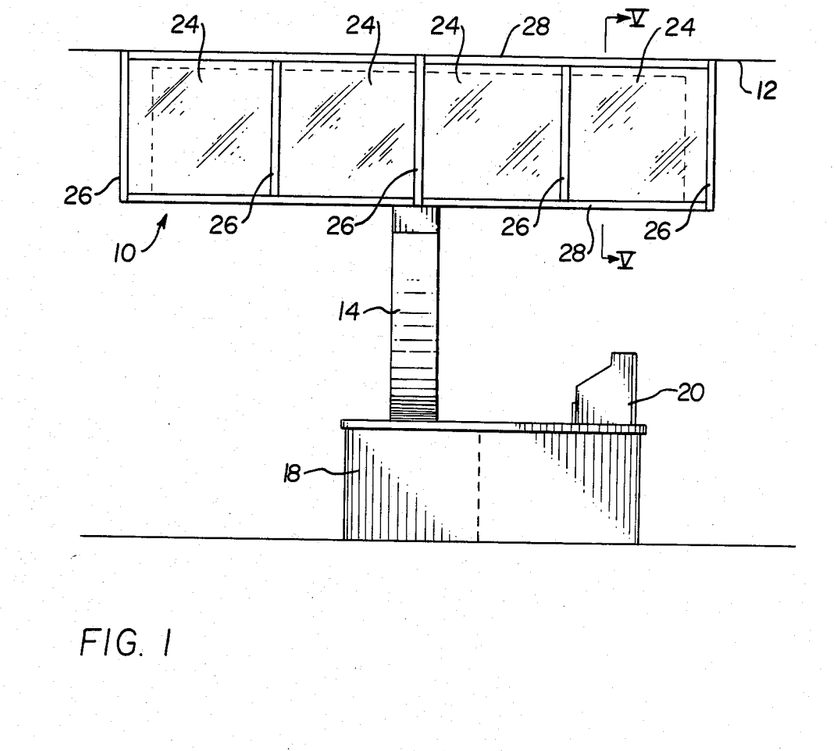
FIG. 1 is a front elevational view of a dispenser, constructed according to the provisions of the present invention, installed at the checkout counter of a retail store.

FIG. 1 shows dispenser 10, the preferred embodiment of the present invention, which is mounted to ceiling 12 of the retail store. A chute 14 receives products from a compartment unit 16 and delivers the products to the clerk stationed at checkout counter 18. Console 20 is used by the checkout clerk to cause dispenser 10 to eject a product from a particular compartment of compartment unit 16.

Figure 2A:
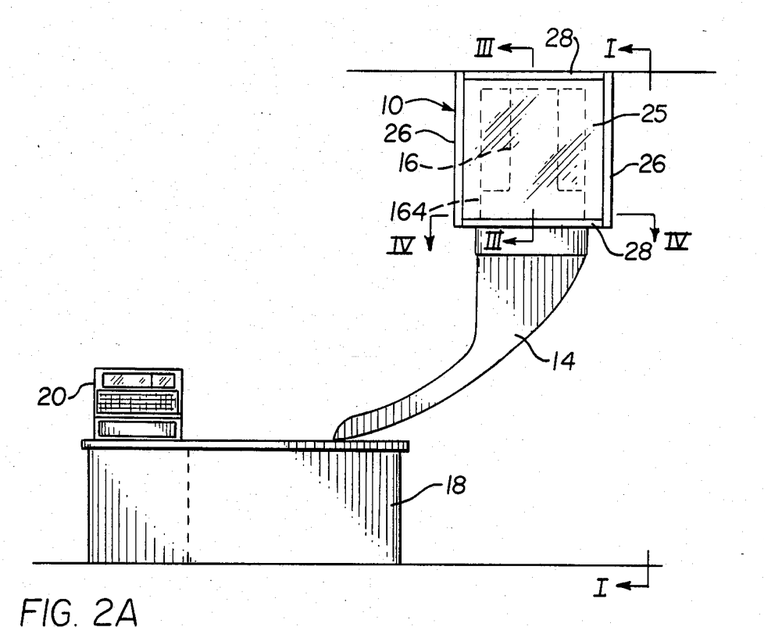
FIG. 2A is a side elevational view of the apparatus shown in FIG. 1, the compartment unit of the dispenser being shown in its retracted position.
Figure 2B:
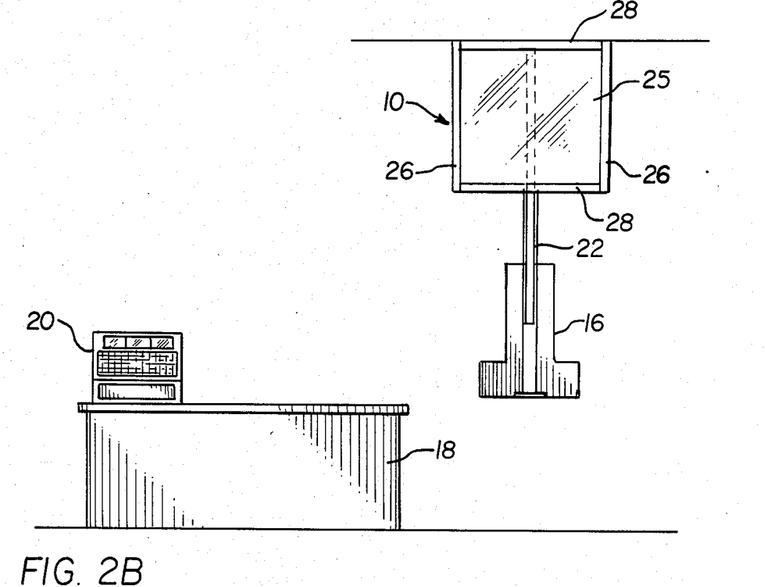
FIG. 2B is a side elevational view of the apparatus shown in FIG. 1, the compartment unit of the dispenser being showed in its extended position.

FIG. 2A shows compartment unit 16 in its retracted position and FIG. 2B shows compartment unit 16 in its extended position. Compartment unit 16 is guided for movement between its extended and retracted positions by guide mechanism 22.

In the retracted position shown in FIG. 2A, direct access to the products held by compartment unit 16 is severely restricted, thus discouraging theft of the products. By moving compartment unit 16 to the extended position shown in FIG. 2B, a store clerk can readily load products into or remove products from the compartments in compartment unit 16.

Figure 3:
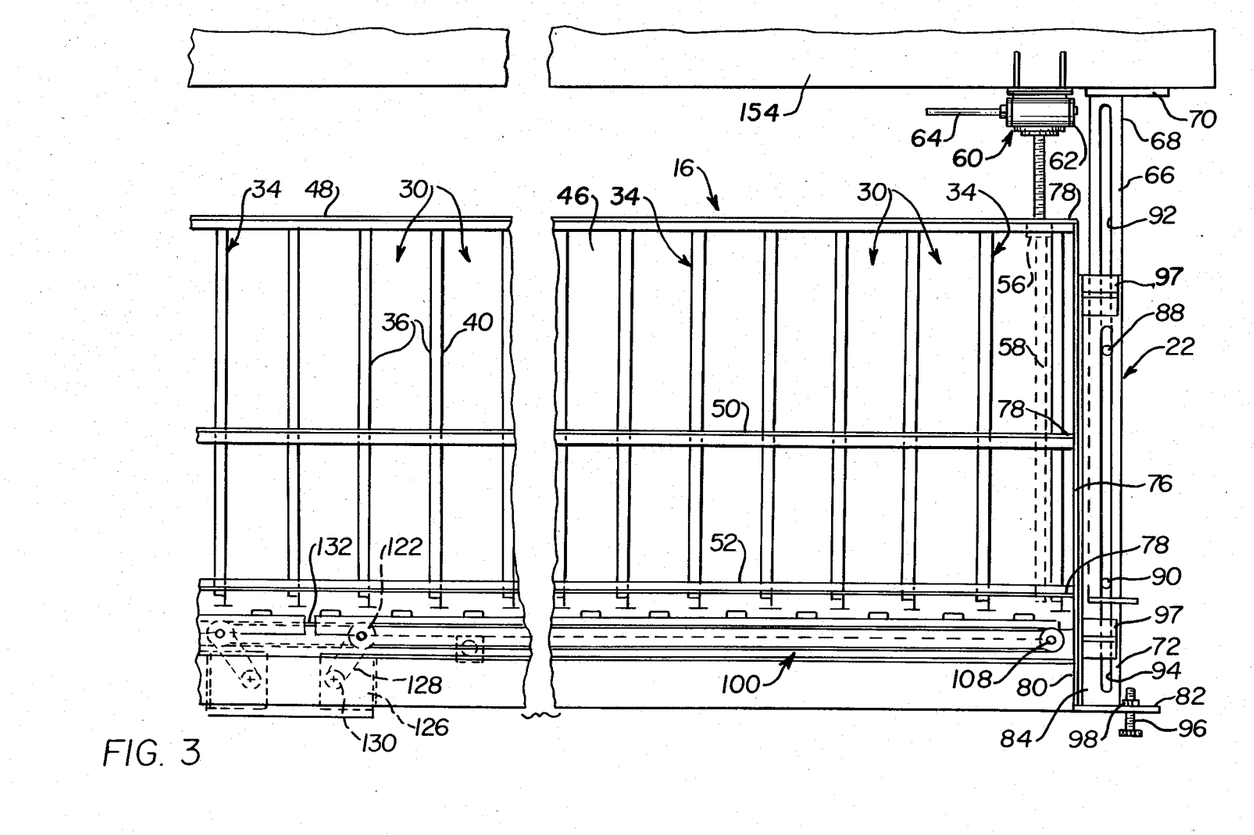
FIG. 3 is a sectional view of the dispenser shown in FIG. 2A taken along the line III—III.

FIGS. 1 through 3 also show side panels 24 and end panels 25 defined by the shell of dispenser 10. Vertical rails 26 and horizontal rails 28 support panels 24 and panels 25. Printed material, preferably product advertisements, can be secured against panels 24 and 25 by horizontal rails 28 and vertical rails 26. FIG. 3 shows the compartments of compartment unit 16, the details of guide mechanism 22, the conveyors and associated apparatus, and the apparatus that raises and lowers compartment unit 16. Compartment unit 16 defines a plurality of individual compartments 30. Each compartment is adapted to receive a vertical stack of products. The products of each stack are ejected from the bottom of the stack. The entire shell 32 of dispenser 10 is not shown in FIG. 3, for purposes of clarity.

Compartments 30 are defined by separators 34. Each separator 34 defines a mounting flange 36, product supports 38 and 39, and a central support 40. Each separator 34 is, preferably, formed from a single sheet of metal. Extremity 43 of each central support 40 is folded back on itself to present to a clerk who is loading compartment unit 16 a blunt edge, rather than a sharp edge. A product is supported within a compartment 30 by a bottom support 38 of one separator 34 and a bottom support 39 of the adjacent separator 34. Accordingly, a stack of products can be formed in a compartment 30 by placing one product on the bottom support 38 of a separator 34 and the bottom support 39 of the adjacent support 34, and then stacking the remainder of the products vertically on top of the bottom product. The size of the product desired to be stacked within a compartment 30 determines the spacing between separators 34.

Figure 4:
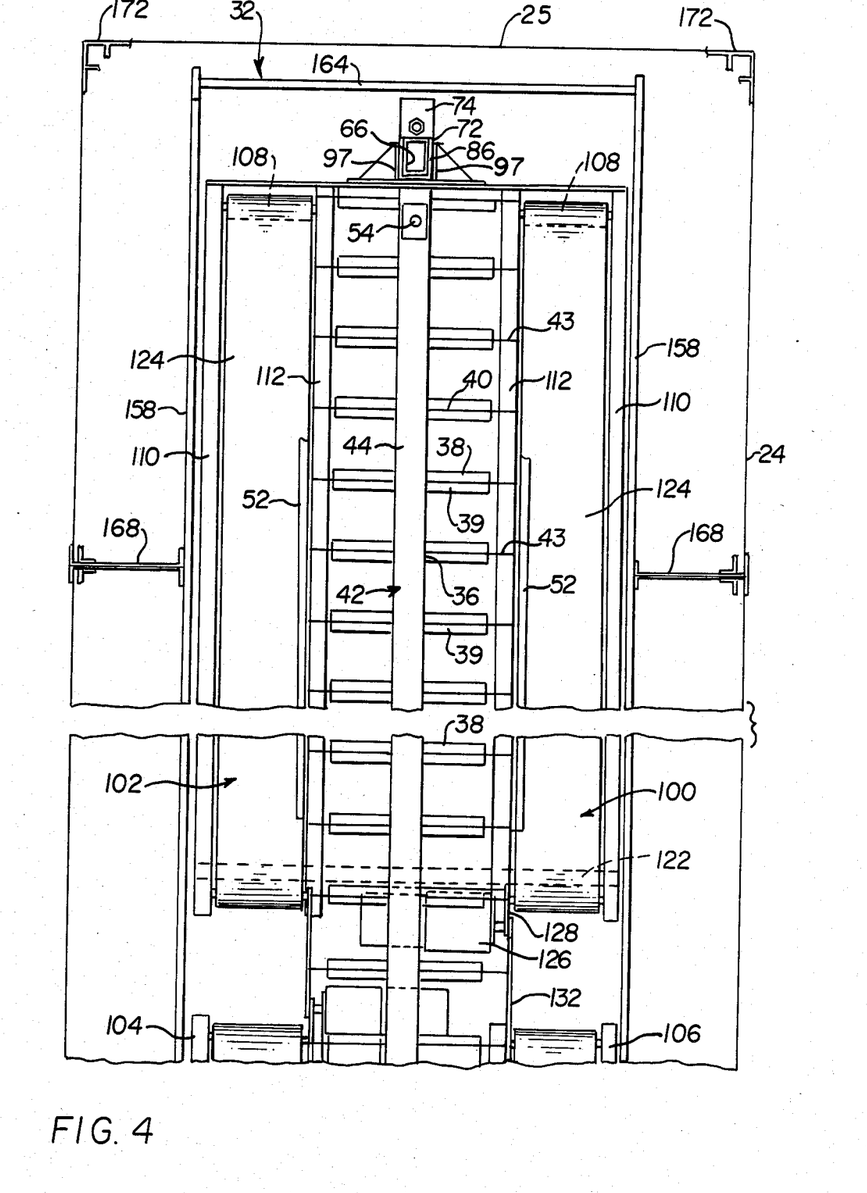
FIG. 4 is a sectional view of the dispenser shown in FIG. 2A taken along the line IV—IV.

Compartment unit 16 includes a central spine 42, which supports all the separators 34. Spine 42 defines a top member 44 and a pair of side members 46. The mounting flange 36 of each separator 34 is secured to a side member 46 of spine 42. As can be seen in FIG. 4, separators 34 are secured to both side members 46 of spine 42 to form two rows of compartments 30. A top angle piece 48 is secured to the tops of edges 43 of central supports 40, a central angle 50 is secured to edges 43 of central supports 40 near their midpoints, and a lower angle support 52 is secured to the bottom of edges 43 of central supports 40. Angles 48, 50 and 52 provide rigidity to separators 34.

Top member 44 of spine 42 defines an opening 54 within which a threaded nut 56 is secured. Nut 56 receives an elongated threaded shaft 58 which is adapted to be received by the opening defined by side members 46. Shaft 58 is a member of right angle drive 60. Housing 62 contains a transmission which receives a shaft 64 and transmits the rotational motion of shaft 64 to shaft 58. Shaft 64 is rotated by a suitable prime mover (not shown). Accordingly, rotation of shaft 64 is transmitted by the transmission of right angle drive 60 to shaft 58. As shaft 58 rotates, it cooperates with threaded nut 56 to raise or lower spine 42 and compartments 30, depending on the direction of rotation of shaft 58. The remaining end of spine 42 that is not shown in FIG. 3 includes a shaft, nut and right angle drive 60 that is identical to right angle drive 60, nut 56, and shaft 58. A single prime mover rotates shaft 64 and the corresponding horizontal shaft of the right angle drive, that is not shown, to raise or lower both ends of spine 42 simultaneously. Right angle drive 60 and the right angle drive not shown in FIG. 3 are suitably secured to the top 154 of shell 32.

FIG. 3 shows a guide mechanism 22 secured to one side of compartment unit 16 and to the top 154 of shell 32. A second guide mechanism identical to guide mechanism 22 is secured to the remaining end of compartment unit 16, not shown in FIG. 3, and the top 154 of shell 32. Accordingly, the guide mechanisms guide the movement of the compartment unit 16 between its extended and retracted positions. Guide mechanism 22 includes three telescoping members. Guide 66 is secured at end 68 to the top 154 of shell 32 with a suitable mounting 70. An end plate 76 is secured to ends 78 of angles 48, 50 and 52. A mounting plate 80 is mounted to the outer surface of end plate 76 and defines a lower supporting flange 82. End 84 of a lower guide 72 is secured to the top surface of flange 82. An intermediate guide 86 is disposed within lower guide 72 and round upper guide 66. A pin 88 is loosely disposed in slot 92 formed in upper guide 66 and a slot (not shown) formed in intermediate guide 86. A pin 90 is loosely disposed in a slot 94 defined by lower guide 72 and the slot defined by intermediate guide 86. Accordingly, compartment unit 16 can be lowered to the limits established by pins 88 and 90, and slots 92 and 94 and the slot defined by intermediate guide 86. A bolt 96 is threaded within a hole defined by flange 82 through a nut 98. Bolt 96 is provided to secure compartment unit 16 to the lower side of shell 32. Four guides 97 are secured to end plate 76 to prevent lateral movement of guides 66, 86 and 72.

Four conveyors 100, 102, 104 and 106 are provided to convey to chute 14 products removed from compartments 30. The conveyors 100, 102, 104 and 106 are identical to each other and, therefore, only conveyor 100 will be described. One end of idler roller 108 is secured to an angle rail 110 which is mounted to end plate 76. The remaining end of idler roller 108 is mounted to a second angle rail 112, which is also mounted to end plate 76. Guides 114 and 116 are mounted to rails 112 and 110, respectively, to prevent ejected products from falling off conveyor 100. Supports 118 and 120 are secured to rails 112 and 110, respectively, to provide further support for conveyor 100. One end of a driver roller 122 is secured to angle rail 110 and the remaining end of drive roller 122 is secured to angle rail 112. A conveyor belt 124 is disposed for continuous rotation around drive roller 122.

A motor 126 is secured to spine 42. Motor 126 causes drive roller 122 and the drive roller of conveyor 106 to rotate, thus causing rotation of conveyor belt 124 and the conveyor belt of conveyor 106. A belt 128 is disposed around drive shaft 130 of motor 126 and drive roller 122. A second belt 132 is disposed around drive roller 122 and the driver roller of conveyor 106. Accordingly, rotation of motor shaft 130 causes rotation of both drive roller 122 and the drive roller of conveyor 106.

The apparatus provided for ejecting products from compartments 30 can be understood best by referring to FIGS. 3 and 5 through 7. A number of guide shafts 134 are mounted to the horizontal members of angle rails 112. Guide shafts 134 are spaced along all four angle rails 112. A bearing 136 is mounted on all guide shafts 134 for sliding movement along shafts 134. A return bearing 138 is mounted to a shaft 135, which is mounted at its ends to rails 112. One end of each of two springs 140 is connected to a spring plate 142 secured to bearing 138. The remaining end of each spring 140 is secured to an angle rail 112. Springs 140 operate to bias bearing 138 toward a position equidistant the ends of shaft 135. An ejector bar 144 is secured to the upper surface of each bearing 136 and 138 for movement therewith. A plurality of solenoids 146 are secured to the upper surface of ejector bar 144 between the flanges 148 and 150 defined by ejector bar 144. When the ejector bar 144 is disposed equidistant from the ends of each guide shaft 134, and shaft 135 is disposed equidistant from the ends of a pair of compartments 30. Each solenoid is so disposed on bar 144 that energizing a solenoid 146 causes its coil, or ejecting member, 152 to rise to the ejecting position shown in FIG. 6B. Accordingly, movement of an ejecting member 152 to its ejecting position and movement of ejecting bar 144 to a final position shown in FIG. 6B causes ejecting member 152 to push a product from the bottom of a stack onto the conveyor belt of a conveyor 100, 102, 104 or 106. A bar 137 is secured at its ends to rails 118. A bearing 141 is secured for sliding movement to bar 137. Bearings 141 and 138 are joined to each other. Accordingly, movement of bearing 141 along bar 137 causes movement of bearing 138 along shaft 135. Any suitable means can be provided for moving ejector bar 144 from its initial position shown in FIG. 7 and FIG. 5 to a final position shown in FIG. 6B, by moving bearing 141 along bar 137.

Figure 5:
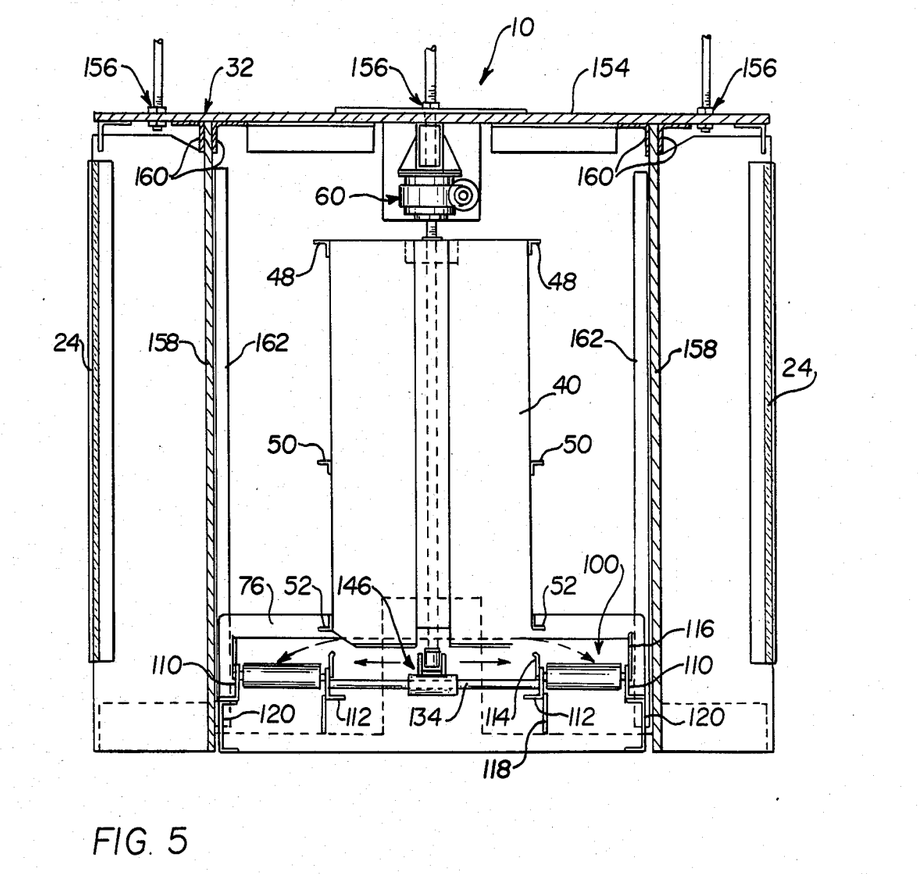
FIG. 5 is a sectional view of the dispenser shown in FIG. 1 taken along the line V—V.
Figure 6A:
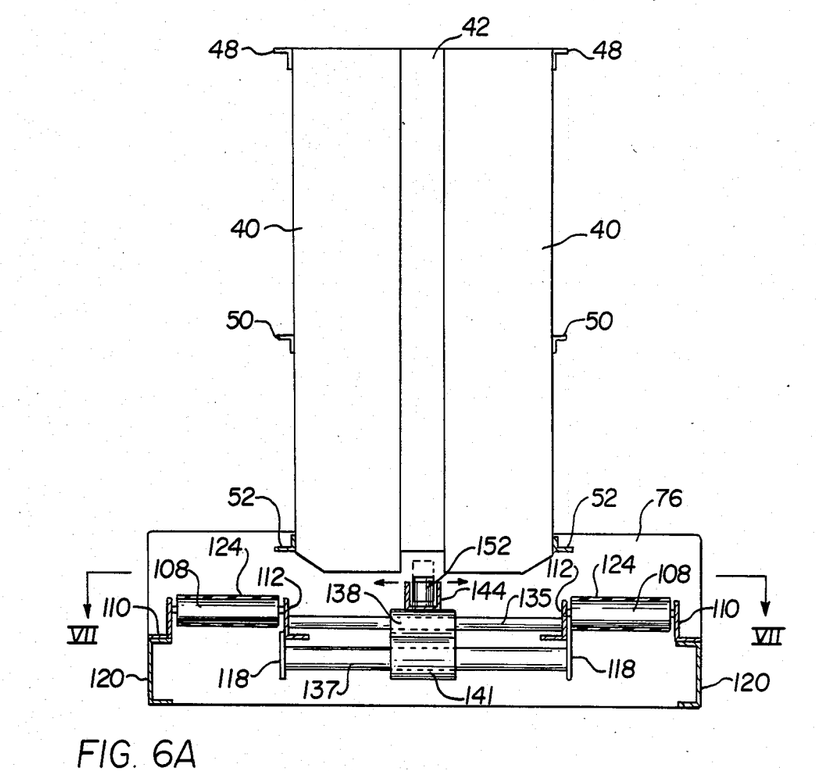
FIG. 6A is a sectional view showing the end support, ejector arrangement, and conveyor of the dispenser shown in FIG. 1.
Figure 6B:
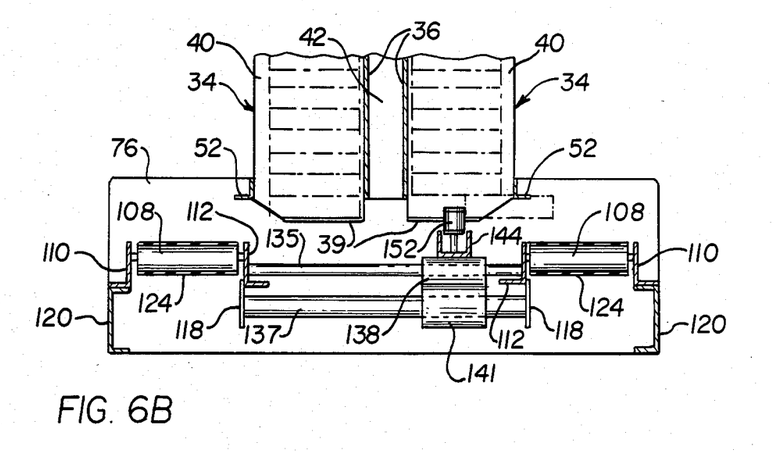
FIG. 6B is a view of the apparatus shown in FIG. 6A with the ejector in a final position and the ejecting member of the ejector in its ejecting position.
Figure 7:
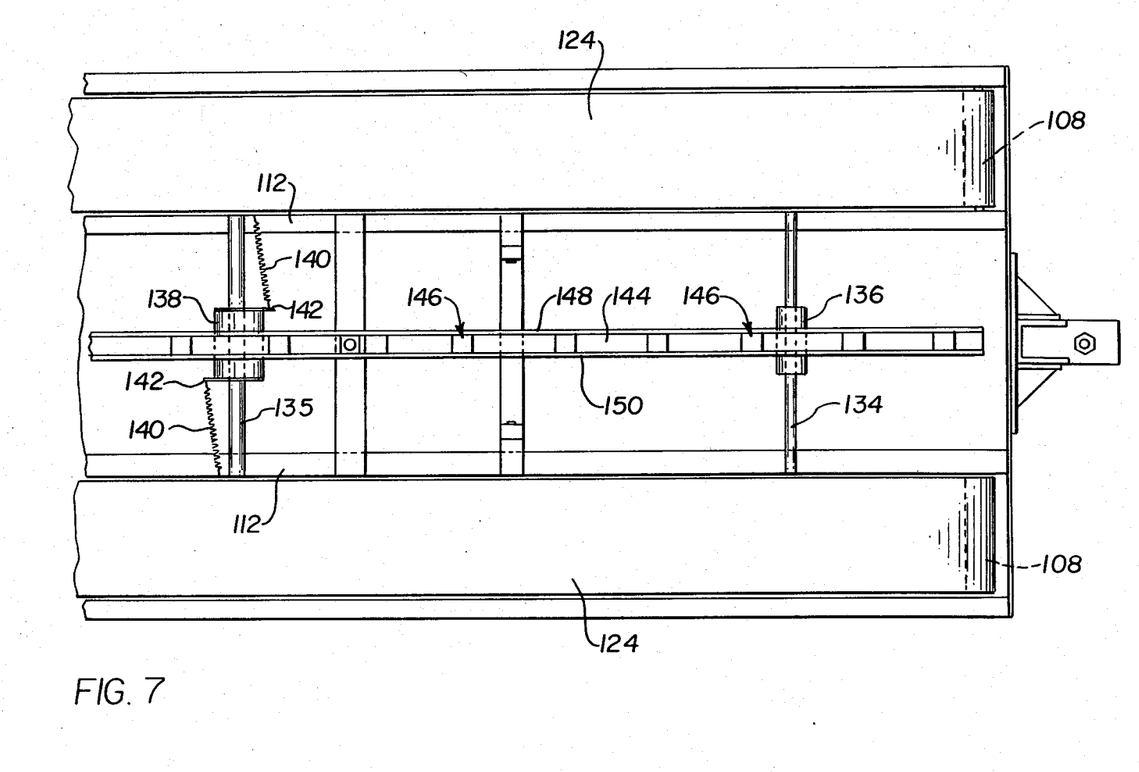
FIG. 7 is a plan view of the apparatus shown in FIG. 6A taken along the line VII—VII.

FIGS. 4 and 5 show shell 32 of dispenser 10. Shell 32 includes a top support 154, which is secured to ceiling 12 by six nut and bolt assemblies 156 (only three shown in FIG. 5). A pair of inner side supports 158 are secured at their upper edges to the lower surface of top support 154 by a pair of angle rails 160. Panels 158 are stabilized along their height by an angle rail 162. The bottom edges of each end panel 158 is secured to the outer surface of a rail 120. An inner end panel 164 is secured at its edges to rails 162.

Outer side panels 24 are secured to inner side panels 158 by brackets 168. Outer end panels 25 are secured to outer side panels 24 by brackets 172. Outer panels 24 and 25 can support such printed material as product advertisements.

The checkout clerk specifies from which stack a product will be ejected by operating console 20. Console 20 can include pushbuttons, each of which corresponds to a compartment 30 or a numeral. In the former case, the checkout clerk need push only one button to indicate from which stack a product will be ejected. In the latter case, the checkout clerk can enter a numerical code through the console which corresponds to the stack from which the product will be ejected. In either case, the entry made by the checkout clerk will cause an ejecting member 152 to rise to its ejecting position from its passive position (shown in FIG. 6A) and will cause ejector bar 144 to move to a final position, toward either end of guide shafts 134. Accordingly, ejecting member 152 pushes the desired product onto a conveyor. The checkout clerk's entry also energizes the motors which cause conveyors 100, 102, 104 and 106 to begin operating and to carry the ejected product to chute 14, which receives the ejected product and guides it to the checkout clerk stationed at checkout counter 18. It should be noted that the electrical communication between console 20 and dispenser 10 is conventional and well known, as is the control logic associated with console 20 that translates the checkout clerk's entry to an electrical signal which energizes a solenoid 146.

Further, console 20 can be tied to a conventional data processing system which interprets the entry made by the checkout clerk to update information stored in electronic media pertaining to the inventory levels of the product stored by the dispenser. Provisions can be made for automatically producing product orders when inventory reaches a predetermined level.

Further, conventional logic can be supplied to control the order in which compartments are accessed if more than one compartment contains the same product, to provide proper rotation of perishable items.

What is claimed is:

1. A product dispenser comprising:
   a shell;
   at least one storage compartment, said compartment being capable of receiving and storing a plurality of products;
   said shell and compartment including means adapted to suspend said dispenser from a ceiling;
   said storage compartment being capable of assuming a retracted position in which said compartment cooperates with said shell to prevent direct access to the products, and an extended position in which direct access to the products is possible to permit loading and unloading of said compartment;
   means for moving said compartment between said extended and retracted positions along a vertical path when said dispenser is mounted to the ceiling;
   means selectively actuable for ejecting at least one product from said compartment; and
   means for receiving a said ejected product and delivering said ejected product to a desired location.

2. The dispenser recited in claim 1 wherein said receiving means includes a conveyor which receives an ejected product and conveys said ejected product to a dispensing port defined by said shell, and further includes a chute which receives said ejected product from said dispensing port and guides it to said desired location.

3. The dispenser recited in claim 1 wherein said dispenser includes a plurality of said storage compartments.

4. The dispenser recited in claim 3 wherein products are stacked vertically in each said compartment.

5. The dispenser recited in claim 4 wherein said ejecting means is adapted to eject the bottom product of each said stack.

6. The dispenser recited by claim 1 wherein said shell is secured to the ceiling of the room.

7. The dispenser recited by claim 6 wherein said shell defines at least one surface adapted to receive and support printed material.

8. The dispenser recited by claim 7 further comprising printed advertisement supported by said surface.

9. A product dispenser comprising:
   a shell suspended from the ceiling of a room which defines an ejecting port;
   a compartment unit having a plurality of compartments and further adapted to be received by said shell, each said compartment being adapted to receive a stack of products;
   means for guiding the movement of said compartment unit between a retracted position in which direct access to the products cannot be had, and an extended position, in which access to the products is possible to permit the stacking and unstacking of said compartments;
   means for moving said compartment unit along said guiding means between said retracted and extended positions;
   a plurality of ejectors, one said ejector corresponding to each said compartment, each said ejector being so mounted to said compartments that it is capable of movement between an initial position and a final position, each said ejector including an ejecting member capable of movement between an ejecting position, in which movement of said ejector between said initial and final positions causes said ejecting member to contact at least one product from the bottom of said stack and remove said product from the said compartment corresponding to said ejector, and a passive position, in which movement of said ejector between said initial and final positions does not cause said ejecting member to so contact a said product, said ejectors being so mounted that they move as a unit between said initial and final positions;
   means for causing said ejectors to move as a unit between said initial and final positions;
   means for moving each said ejecting member between its ejecting and passive positions;
   a conveyor disposed proximate the bottoms of said compartments adapted to receive and convey to said ejecting port products removed from the bottom of said stacks; and
   means for receiving said removed products and guiding them to a desired location.

10. The dispenser recited in claim 9 wherein said ejectors are solenoids mounted on a rigid bar and each said ejecting member is the electrical coil member of a said solenoid.

11. The dispenser recited in claim 9 wherein said shell defines at least one surface adapted to receive and support printed material.

12. The dispenser recited in claim 11 further comprising printed advertisements supported by said surface.

13. A product dispenser comprising:
   a shell;
   at least one storage compartment, said compartment being capable of receiving and storing a plurality of products;
   said storage compartment being capable of assuming a retracted position in which said compartment cooperates with said shell to prevent direct access to the products, and an extended position in which direct access to the products is possible to permit loading and unloading of said compartment;
   means for vertically changing the position of said compartment when said dispenser is mounted to a ceiling to move said compartment between its said extended and retracted positions;
   means selectively actuable for ejecting at least one product from said comparment; and
   means for receiving a said ejected product and delivering said ejected product to a desired location.

* * * * *